US009190800B2

(12) United States Patent
Luo et al.

(10) Patent No.: US 9,190,800 B2
(45) Date of Patent: Nov. 17, 2015

(54) Q-SWITCHED ALL-FIBER LASER

(71) Applicants: Fei Luo, Winchester, MA (US); Tung Feng Yeh, Waltham, MA (US)

(72) Inventors: Fei Luo, Winchester, MA (US); Tung Feng Yeh, Waltham, MA (US)

( * ) Notice: Subject to any disclaimer, the term of this patent is extended or adjusted under 35 U.S.C. 154(b) by 0 days.

(21) Appl. No.: 14/328,036

(22) Filed: Jul. 10, 2014

(65) Prior Publication Data
US 2015/0295381 A1    Oct. 15, 2015

Related U.S. Application Data

(63) Continuation-in-part of application No. 12/022,255, filed on Jan. 30, 2008, now abandoned.

(60) Provisional application No. 60/901,255, filed on Feb. 13, 2007.

(51) Int. Cl.
*H01S 3/121* (2006.01)
*H01S 3/067* (2006.01)
*H01S 3/117* (2006.01)
*H01S 3/106* (2006.01)
*H01S 3/115* (2006.01)

(52) U.S. Cl.
CPC ............. *H01S 3/0675* (2013.01); *H01S 3/1067* (2013.01); *H01S 3/115* (2013.01); *H01S 3/117* (2013.01)

(58) Field of Classification Search
CPC ...... H01S 3/0675; H01S 3/1067; H01S 3/121
USPC ............................................................ 372/14
See application file for complete search history.

(56) References Cited

U.S. PATENT DOCUMENTS

| 5,305,335 | A | * | 4/1994 | Ball et al. ........................... 372/6 |
| 6,058,226 | A | * | 5/2000 | Starodubov ..................... 385/12 |
| 6,885,792 | B2 | * | 4/2005 | Eggleton et al. ................. 385/37 |
| 7,130,319 | B1 | * | 10/2006 | Kaneda et al. .................. 372/10 |

FOREIGN PATENT DOCUMENTS

CN          101291037          10/2008

OTHER PUBLICATIONS

Fei Luo, T. Yeh, LPFG Modulator for Fiber Laser Q Switching, Proc. of SPIE vol. 7195, 2009.

* cited by examiner

*Primary Examiner* — Tod T Van Roy
(74) *Attorney, Agent, or Firm* — Anderson Gorecki & Rouille LLP

(57) ABSTRACT

A Q-switched all-fiber laser has a long period fiber grating (LPFG) switch with optical spectral characteristics that are controlled by application of stress. An actuator applies stress to selected sections of the LPFG in order to switch a fiber laser cavity at a specified wavelength. A controller controls the application of stress in the time domain, thereby switching the Q-factor of the fiber laser cavity.

18 Claims, 23 Drawing Sheets

Q-SWITCHED ALL-FIBER LASER

CROSS-REFERENCE TO RELATED APPLICATIONS

This application is a continuation-in-part of U.S. patent application Ser. No. 12/022,255, entitled Q-SWITCHED ALL-FIBER LASER, filed Jan. 30, 2008, which claims the benefit of priority to U.S. Provisional Patent Application 60/901,255, filed Feb. 13, 2007, entitled Q SWITCHED FIBER LASER WITH ALL FIBER CONFIGURATIONS, both of which are incorporated by reference.

BACKGROUND

Characteristic features of fiber lasers include high output beam quality, compact size, ease-of-use, and low running cost. Fiber lasers can generate either continuous-wave (CW) radiation or pulse radiation. Pulsed operation can be achieved via Q-switching techniques. Q-switched fiber lasers are preferred for applications such as micro-machining, marking, and scientific research due to their high peak power and excellent beam quality. Q-switching is achieved by inserting a fast optical switch in the laser resonance cavity to control optical loss in the cavity. In particular, the optical switch must have fast speed, low insertion loss and high switch extinction ratio. Initially, the laser cavity is kept on a low Q factor state, laser oscillation cannot occur at this initial period, but energy from a pump source accumulates in the gain medium. Subsequently, the laser cavity is switched to a high Q factor state, so that laser oscillation builds up quickly in the cavity and generates a high peak power laser pulse. When the laser cavity is switched between low Q and high Q by the optical switch, sequenced laser pulses are produced.

Optical switching for Q-switching can be achieved by either active or passive means. Examples of active Q-switching means include acousto-optic modulators (AOMs) and electro-optic modulators (EOMs). The AOM comprises optical crystals such as tellurium dioxide, crystalline quartz, and fused silica. The EOM comprises optical materials such as potassium di-deuterium phosphate (KD*P), beta barium borate (BBO), lithium niobate ($LiNbO_3$), as well as $NH_4H_2PO_4$ (ADP), and other materials. One drawback of known AOM and EOM devices is that they are relatively bulky. This is a drawback particularly for Q-switching in fiber laser system, because the fibre core has a relatively small diameter, the difference of which relative to the size of the modulator complicates light coupling between the device and an optical fiber. Further, AOM and EOM devices are relatively expensive.

A typical configuration of a Q-switched fiber laser is illustrated in FIG. 1. The laser cavity comprises a pair of fiber Bragg grating (FBG) reflectors (15, 35) having the same center wavelength, a gain fiber (18) which provides optical gain, and an optical switch (90) coupled to an optical fiber pigtail (20) for coupling a light signal between the fiber and the switch. The optical switch may be either an AOM or EOM type. A pump source (1) provides pump light (5) which is coupled to the fiber laser cavity to excite the gain fiber (18). The FBG reflectors provide optical feedback for laser oscillation. The optical switch (90) is employed as a switch to control optical loss within the laser cavity, and thereby provide Q-switching. Initially, the cavity loss is kept on a high level with the switch "off" (low Q factor state of the laser cavity), at which time no light signal passes through the switch (90). As discussed above, laser oscillation does not occur at this time, but energy from pump light source (5) accumulates in the gain fiber (18). Subsequently, the cavity loss is reduced over a relatively short time by "switching on" the optical switch to a low loss level (high Q factor state of the laser cavity), at which time the light signal passes through optical switch (90). Consequently, laser oscillation builds up quickly in the cavity and generates a high peak power laser pulse. The FBG pair (15, 35) have the same center wavelength and function as narrow band reflective mirrors which provide optical feedback to the laser cavity and confine the laser oscillation wavelength to the FBG wavelength. Since the FBG has a relatively narrow reflective bandwidth, the laser oscillates only at this wavelength and the output has a narrow wavelength spectrum. When the laser cavity is switched sequentially between the low Q factor state and the high Q factor state by means of the optical switch (90), sequenced laser pulses are produced. Switch control is achieved by means of a signal (95) from an external controller (96). One device of the FBG pair (15, 35) is partially transparent and has relatively lower reflectivity, resulting in a percentage of the generated laser light being permitted to leave laser cavity and deliver the laser output (38 or 42).

Referring to FIG. 2a, the FBG is formed by introducing a periodic changes of refractive index in the fiber core. The modified area (151) within the fiber core has a smaller refractive index difference of period $\Lambda_B$ relative to the adjacent unmodified area (152). Several techniques are known for changing the refractive index of discreet areas of the fibre core. One technique is to expose the area to a UV laser beam, e.g., area (151) is altered by exposure to UV light, but area (152) is neither exposed nor altered.

The principle characteristic parameters of a FBG are center wavelength $\lambda_B$, bandwidth $\Delta\lambda_B$, and reflectivity. The condition for high reflection, known as the Bragg condition, relates the reflected wavelength, or Bragg wavelength, $\lambda_B$ to the grating period $\Lambda_B$ and the effective refractive index of the fiber core n via:

$$\lambda_B = 2n\Lambda_B.$$

FIGS. 2b, 2c, and 2d illustrate the spectral characteristics of a FBG. When broad band light (110, FIG. 2a) having spectrum (120, FIG. 2b) is input into the FBG as shown, the reflected light (112, FIG. 2a) has a corresponding spectrum (122, FIG. 2c), and the transmitted light (111, FIG. 2a) has a corresponding spectrum (121, FIG. 2d).

Somewhat similar to the FBG in terms of physical configuration, a Long Period Fiber Grating (LPFG) has a grating period $\Lambda_L$ which is considerably longer than the period $\Lambda_B$ of the FBG, i.e., typically $\Lambda_L$ is 200~2000 times longer than $\Lambda_B$. The LPFG couples the fundamental mode in the fiber core with the cladding modes of the fiber and propagates them in the same direction. The excited cladding modes are attenuated, resulting in the appearance of resonance loss in the transmission spectrum. However, in contrast with the FBG, the LPFG does not produce reflected light. FIGS. 3a, 3b and 3c illustrate the physical configuration and the spectral transmission characteristics of a LPFG. The periodic grating structure (22, FIG. 3a) can be made by using a UV laser beam to "burn" discreet, periodically spaced areas in the fiber core in a manner which is similar to that described above with reference to the FBG, where the modified area (251) exhibits a refractive index change in comparison with unmodified area (252). Recent research suggests that the modified areas can be also formed by using a high voltage electric arc discharge or $CO_2$ laser to "burn" the fiber, i.e., introducing structural changes and slight geometrical deformation in the irradiated area of the fibre. Mechanical stress can be used, e.g., by applying static stress to the areas of the fibre to be modified through a corrugated plate. The refractive index at the areas subjected to stress is changed in accordance with the photoelastic effect, but the adjacent areas which are not subjected to stress are unmodified.

When a broad band light (210, FIG. 3a) having spectrum (220, FIG. 3b) is input into the LPFG, the transmitted light (211, FIG. 3a) has a corresponding spectral characteristic (221, FIG. 3c), several resonance loss peaks (222, 223), including the fundamental mode coupling with different cladding modes of the fiber. However, there is no light reflection. Considering resonance loss peak (222, FIG. 3c), having a center wavelength XL, and bandwidth $\Delta\lambda_L$, the resonance loss of the LPFG is due to the coupling of the fundamental mode in the fiber core with the cladding modes of the fiber. The phase matching between the fundamental mode and cladding modes at wavelength $\lambda_{mL}$ can be expressed as:

$$\lambda_{mL}=(n_{core}-n_{cl}^m)\Lambda_L,$$

where $n_{core}$ is the effective refractive index of the fundamental mode, $n_{cl}^m$ is the effective refractive index of the $m^{th}$ cladding mode, and $\Lambda_L$ is the period of the LPFG. Since several cladding modes can satisfy this condition, each one is at a different center wavelength $\lambda_{mL}$, and thus the transmission spectrum of the LPFG exhibits a series of transmission loss notch peaks (222, 223, FIG. 3C).

FIGS. 4a-4c illustrate the physical configuration and the spectral transmission characteristics of a phase shifted LPFG. In the phase shifted LPFG, a part of the grating period is shifted at the grating center by $\Lambda$p. As a result, a phase shift is introduced into the LPFG. For example, by introducing a $\pi$-phase shift at the center of the LPFG, the notch peak (See FIG. 3c) is changed to a reverse peak (232, FIG. 4c). For a broad band input (220, FIG. 4b), a corresponding transmission spectrum (231, FIG. 4c) of the phase shifted LPFG is produced, enabling transmission at wavelength XL.

FIGS. 5a-5c illustrate the physical configuration and the spectral transmission characteristics of cascaded LPFGs. Cascaded LPFGs are formed by connecting a pair of LPFGs (25, 26) in series. Each of the LPFGs has a grating length $d_1$ and $d_2$, and together define a separation distance of L. When broad band light (210) having spectrum (220, FIG. 5b) is input into the cascaded LPFGs, the corresponding transmitted light (211) has a corresponding spectral transmission response (241, FIG. 5c). It can be seen from FIGS. 5b and 5c that the spectrum of the transmitted light has several spectral transparent peaks (242, 244 and 246) and several spectral loss peaks (245, 243). This is due to interference between the fundamental mode and cladding modes. The first LPFG couples part of the fundamental mode to the cladding modes, and then the coupled cladding modes and fundamental mode travel along the fiber simultaneously to the second LPFG. At the second LPFG, the two modes interact with each other and generate spectral interference fringe patterns. The fringe spacing $\Delta\lambda_{PL}$ is related to the grating length $d_1$, $d_2$, d and the separation distance L between the two LPFGs. An increase in L corresponds with a decrease in the fringe spacing $\Delta\lambda_{PL}$. For multi-channel filter applications the distance L is typically less than 600 mm.

SUMMARY

All examples and features mentioned below can be combined in any technically possible way.

In accordance with one aspect a fiber laser apparatus configured to generate Q switched optical pulses comprises: a first fiber Bragg grating having a first reflective center wavelength; a second fiber Bragg grating having a second reflective center wavelength, the second reflective center wavelength being in a reflective wavelength bandwidth of the first fiber Bragg grating, the first and second fiber Bragg gratings configured to provide optical feedback for laser oscillation and to confine laser oscillation wavelength; at least one long period fiber grating disposed between the first fiber Bragg grating and the second fiber Bragg grating, the long period fiber grating having a switching wavelength in which switching wavelength bandwidth fully covers the wavelength bandwidth of the first fiber Bragg grating and the second fiber Bragg grating; a gain fiber disposed between the first fiber Bragg grating and the second fiber Bragg grating, the gain fiber configured to provide optical gain; and at least one actuator configured to apply stress to the long period fiber grating to cause switching of Q factor of the laser cavity and generation of Q switched optical pulses. In some implementations the actuator causes temporary deformation of the long period fiber grating, resulting in a change of effective refractive index. In some implementations the apparatus further comprises a controller which controls the actuator such that the stress is applied in a periodic time varying manner. In some implementations the actuator applies the stress acoustically. In some implementations the apparatus further comprises an optical fiber selected from a group including: normal fiber, double clad fiber, photonic crystal fiber, polarization maintaining fiber and rare earth doped fiber. In some implementations the at least one long period fiber grating is selected from a group including: a normal long period fiber grating, a phase shifted long period fiber grating and a cascaded long period fiber grating.

In accordance with another aspect a fiber laser apparatus configured to generate Q switched optical pulses comprises: a fiber Bragg grating reflector configured to provide optical feedback for laser oscillation and to confine laser oscillation wavelength; a fiber loop mirror formed by splicing first and second distal ends of a fiber coupler; at least one long period fiber grating disposed between the fiber Bragg grating reflector and the fiber loop mirror, the long period fiber grating having a switching wavelength in which a switching wavelength bandwidth fully covers a wavelength bandwidth of the fiber Bragg grating; a gain fiber configured to provide optical gain; and at least one actuator configured to apply stress to the long period fiber grating to cause switching of Q factor of the laser cavity and generation of Q switched optical pulses. In some implementations the actuator causes temporary deformation of the long period fiber grating, resulting in a change of effective refractive index. In some implementations the apparatus further comprises a controller which controls the actuator such that the stress is applied in a periodic time varying manner. In some implementations the actuator applies the stress acoustically. In some implementations the apparatus further comprises an optical fiber selected from a group including: normal fiber, double clad fiber, photonic crystal fiber, polarization maintaining fiber and rare earth doped fiber. In some implementations the at least one long period fiber grating is selected from a group including: a normal long period fiber grating, a phase shifted long period fiber grating and a cascaded long period fiber grating.

In accordance with another aspect a fiber laser apparatus configured to generate Q switched optical pulses comprises: a fiber Bragg grating reflector configured to provide optical feedback for laser oscillation and to confine laser oscillation wavelength; a fiber loop mirror formed by splicing first and second distal ends of a fiber coupler; at least one long period fiber grating disposed in the fiber loop mirror, the long period fiber grating having a switching wavelength in which a switching wavelength bandwidth fully covers a wavelength bandwidth of the fiber Bragg grating reflector; a gain fiber configured to provide optical gain; and at least one actuator configured to apply stress to the long period fiber grating to cause switching of Q factor of the laser cavity and generation of Q switched optical pulses. In some implementations the actuator causes temporary deformation of the long period fiber grating, resulting in a change of effective refractive index. In some implementations the apparatus further comprises a controller which controls the actuator such that the stress is applied in a periodic time varying manner. In some implementations the actuator applies the stress acoustically. In some implementations the apparatus further comprises an optical fiber selected from a group including: normal fiber, double clad fiber, photonic crystal fiber, polarization maintaining fiber and rare earth doped fiber. In some implementations the at least one long period fiber grating is selected from a group including: a normal long period fiber grating, a phase shifted long period fiber grating and a cascaded long period fiber grating.

BRIEF DESCRIPTION OF THE FIGURES

FIGS. 9b, 9c, 9d and 9e illustrate the spectral transmission characteristics of the implementation of FIG. 9a.

DETAILED DESCRIPTION

Figure 1:
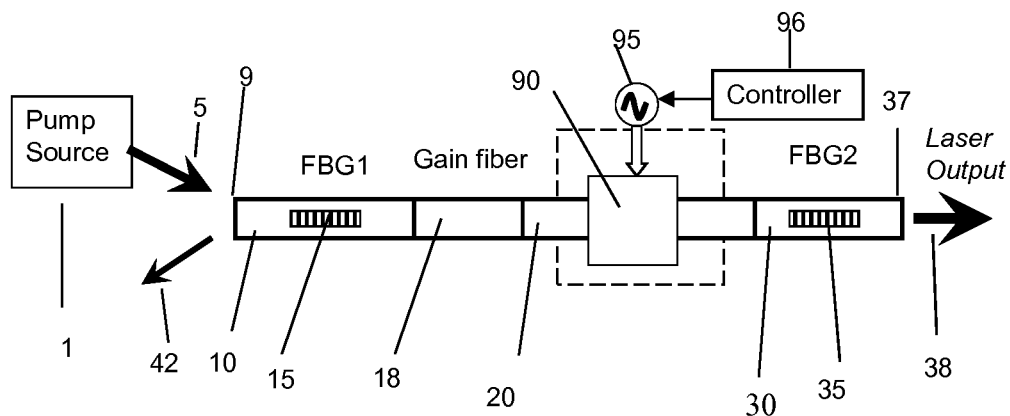
FIG. 1 illustrates the physical configuration of a Q-switched fiber laser.
Figure 2A:
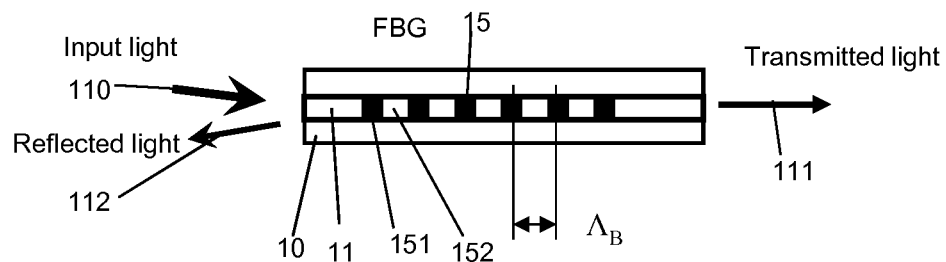
FIGS. 2a, 2b, 2c and 2d illustrate the physical configuration and spectral transmission characteristics of a FBG.
Figure 2B:
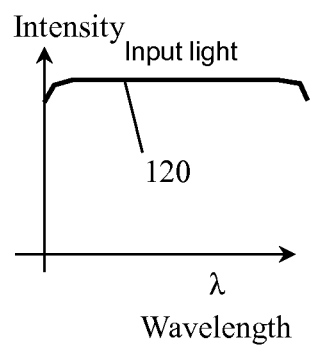
Figure 2C:
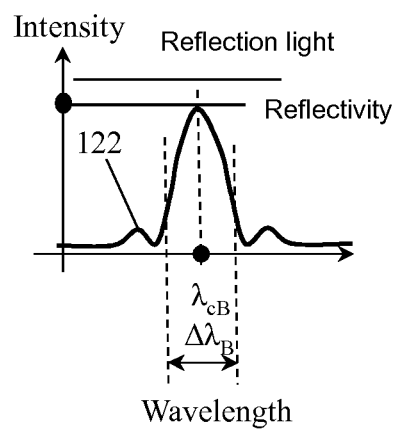
Figure 2D:
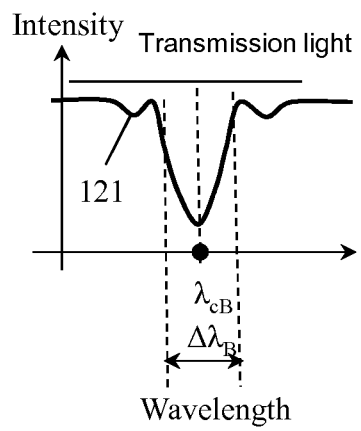
Figure 3A:
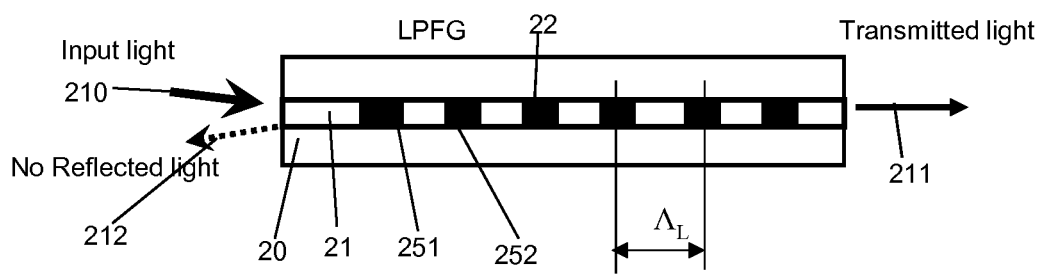
FIGS. 3a, 3b, and 3c illustrate the physical configuration and spectral transmission characteristics of a LPFG.
Figure 3B:
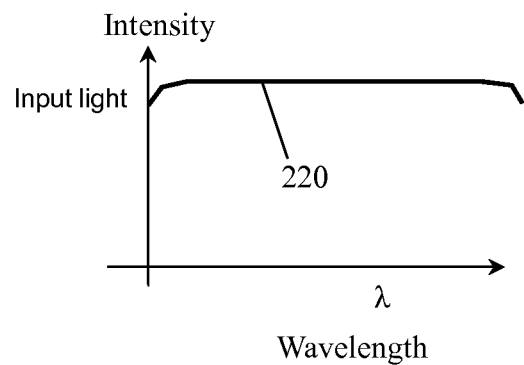
Figure 3C:
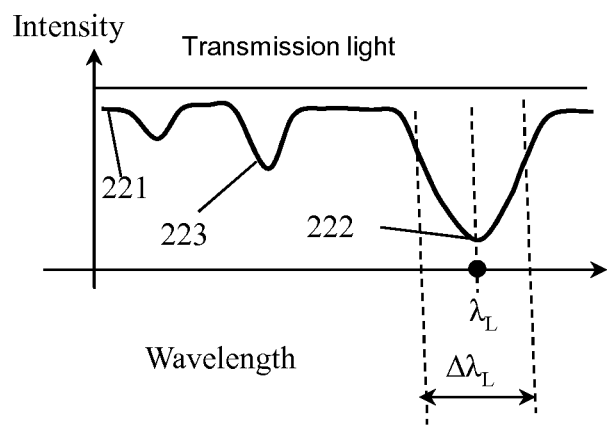
Figure 4A:
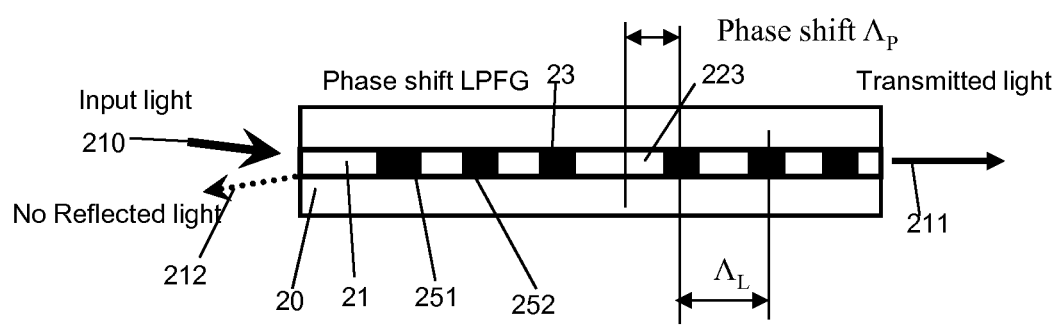
FIGS. 4a, 4b, and 4c illustrate the physical configuration and spectral transmission characteristics of a phase shifted LPFG.
Figure 4B:
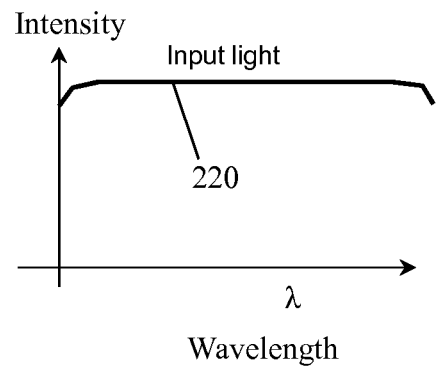
Figure 4C:
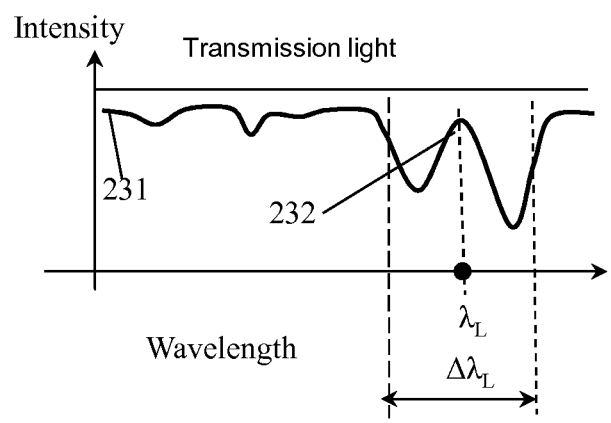
Figure 5A:
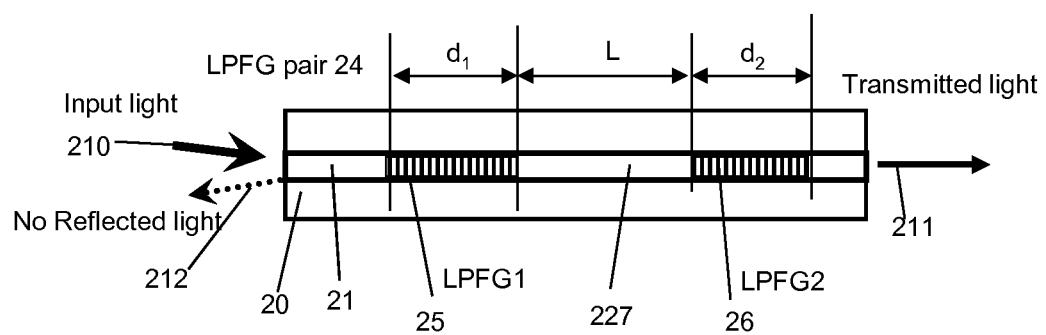
FIGS. 5a, 5b, and 5c illustrate the physical configuration and spectral transmission characteristics of a cascaded LPFG pair.
Figure 5B:
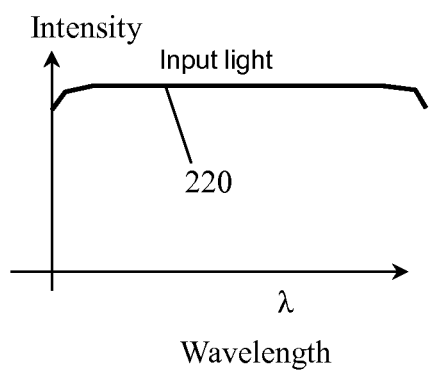
Figure 5C:
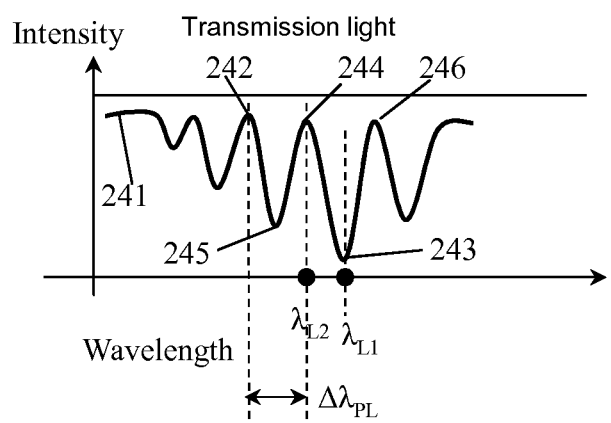
Figure 6A:
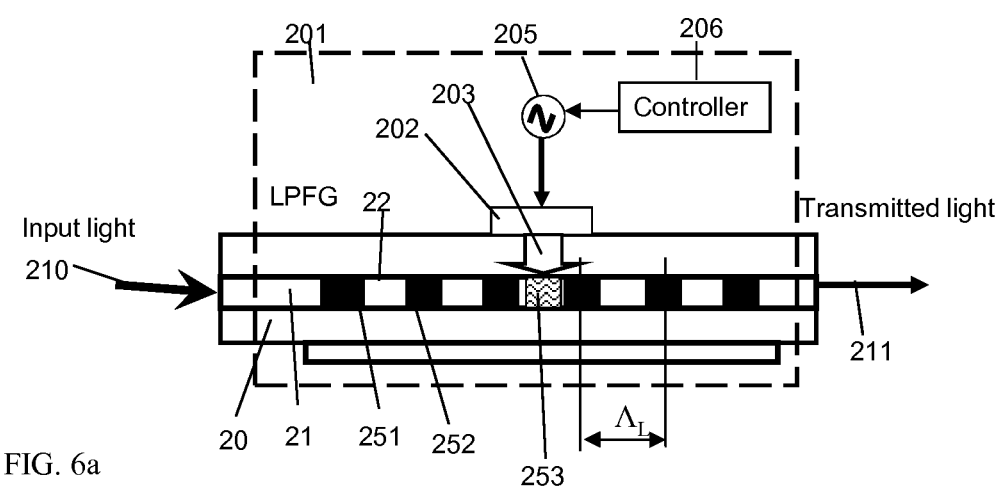
FIGS. 6a, 6b, and 6c illustrate a LPFG optical switch.
Figure 6B:
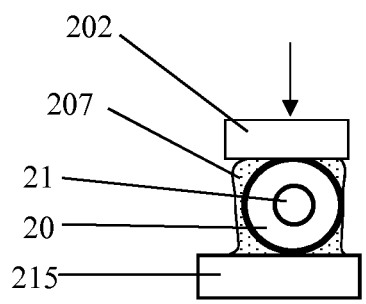
Figure 6C:
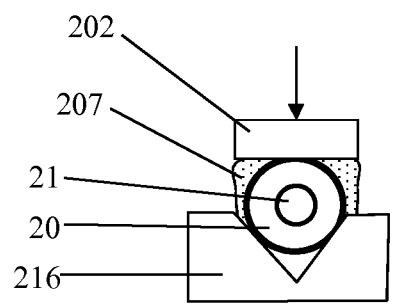

Referring to FIGS. 6a-6c, a LPFG optical switch is provided via the controlled (time, area and force) application of stress to an optical material to introduce refractive index changes in the material in accordance with the photo-elastic effect. As illustrated, a small section (253) of the LPFG (22) is subjected to stress (203) through force applied by an actuator (202). The stress may be applied by mechanical, acoustic or other means. The actuator (202) may include a piezo actuator that operates in response to a switching voltage (205) from a controller (206). The applied stress (203) causes a temporary deformation of the material at section (253) and a corresponding refractive index change at section (253). The periodic structure and spectral transmission behavior of the LPFG are changed in a corresponding manner. In particular, the magnitude of the refractive index change is related to the magnitude of applied force, the periodic structure and spectral transmission behavior is related to (a) which areas are subjected to stress and (b) the period and frequency at which stress is applied.

FIGS. 6b and 6c are cross-sectional views of the LPFG of FIG. 6a that illustrate different configurations for applying stress to the fibre (20). In FIG. 6b the LPFG fiber (20) is disposed between actuator (202) and a plate (215). The fiber can be fixed in place with glue (207). FIG. 6c shows an implementation in which a V-groove plate (216) is employed in lieu of the flat plate (215, FIG. 6b) for enhanced fiber fixing and enhanced stress distribution.

Figure 6D:
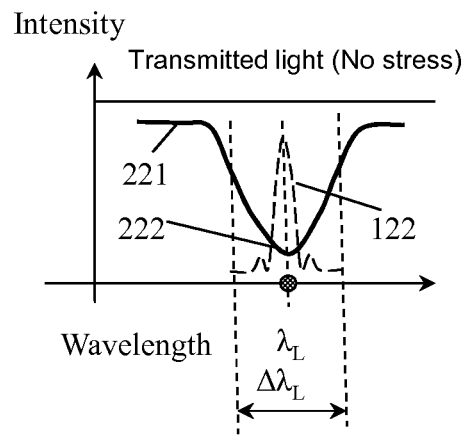
FIG. 6d and FIG. 6e illustrate the spectral transmission behavior of the innovative LPFG switch.
Figure 6E:
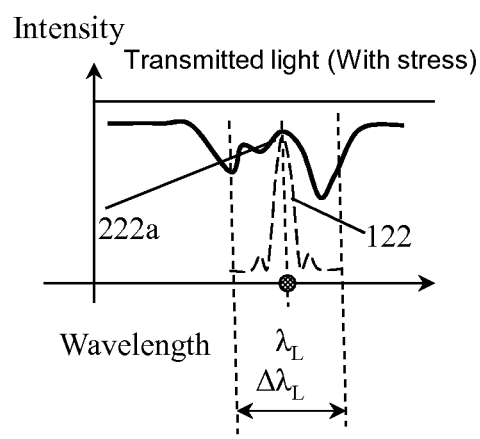

FIG. 6d and FIG. 6e illustrate the spectral transmission behavior of the innovative LPFG switch. The transmission spectrum of the LPFG when no stress is applied is shown by a first section (221, FIG. 6d), i.e., a narrow band input light (122) with center wavelength $\lambda_L$ is blocked since the resonance loss peak (222) of the LPFG is just at this wavelength. This corresponds to the "switch off" state of the LPFG switch. The bandwidth of the signal light is narrower than the bandwidth $\Delta\lambda_L$ of the LPFG. When stress is applied to section (253, FIG. 6a), the transmission spectrum is changed as shown in FIG. 6e, with the resonance loss peak (222, FIG. 6d) becoming peak (222a, FIG. 6e). The narrow band input light (122) can now pass through the LPFG. This corresponds to the "switch on" state of the LPFG switch. Thus, the input light (122) with center wavelength $\lambda_L$ can be switched in response to the control signal applied to the actuator.

Figure 7:
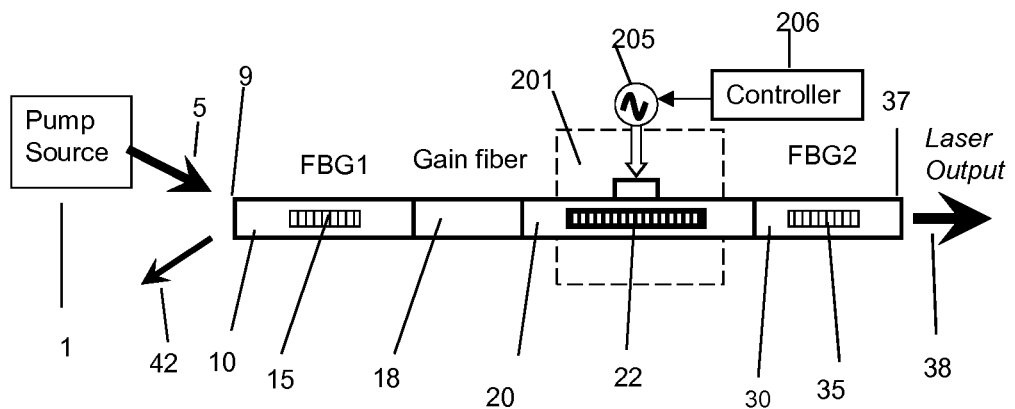
FIG. 7 illustrates use of the LPFG switch as a component of an all-fiber in-line device such as an all-fiber Q-switched laser.

FIG. 7 illustrates use of the LPFG switch as a component of an all-fiber in-line device such as an all-fiber Q-switched laser. The illustrated laser cavity has a Fabry-Perot configuration and includes a pair of FBG reflectors (15, 35) having the same center wavelength $\lambda_B$, a gain fiber (18), and an LPFG switch (201). The resonance loss peak $\lambda_L$ of the LPFG is matched with center wavelength $\lambda_B$ of the FBGs. The bandwidth $\Delta\lambda_B$ of the FBGs is narrower than bandwidth $\Delta\lambda_L$ of the LPFG, i.e., $\Delta\lambda_B \ll \Delta\lambda_L$. The laser oscillation wavelength is confined by the FBGs at wavelength $\lambda_B$. The LPFG switch is employed to switch the Q factor of the laser cavity, i.e., control optical loss in the time domain. Switching is provided in response to a switching voltage (205) applied to the actuator by a controller (206). Pump source (1) couples pump light (5) into the laser cavity to pump gain fiber (18). One or both of the FBG reflectors (15, 35) are partially transparent at its wavelength. Consequently, the laser output (38 or 42) can be provided from either fiber end (37) or fibre end (9), or both fiber ends.

Figure 8A:
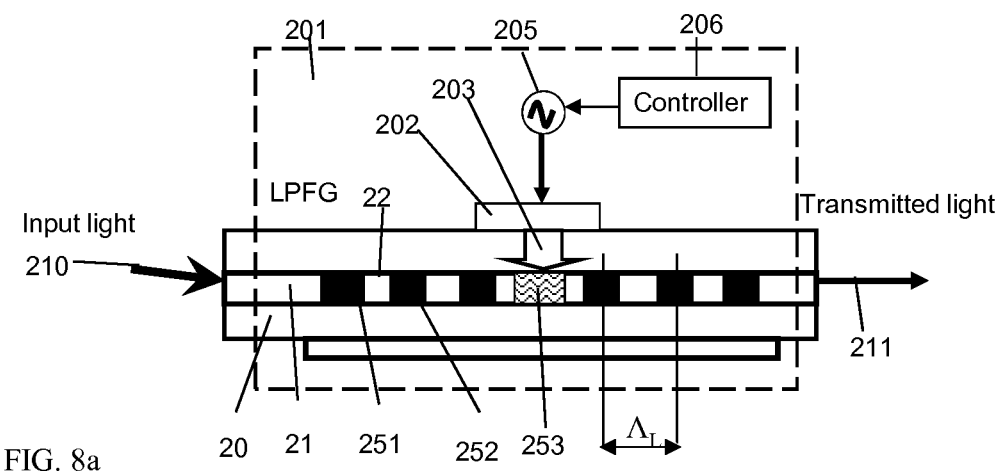
FIGS. 8a, 8b, and 8c illustrate an LPFG switch formed by employing a phase shifted LPFG.
Figure 8B:
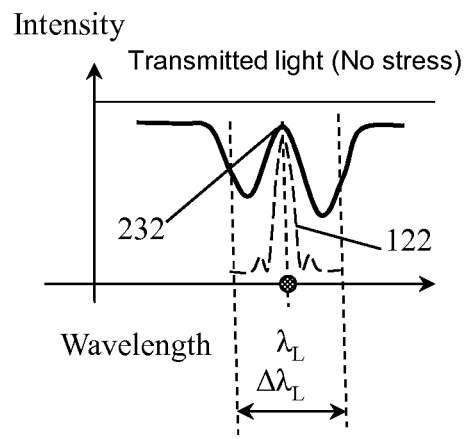
Figure 8C:
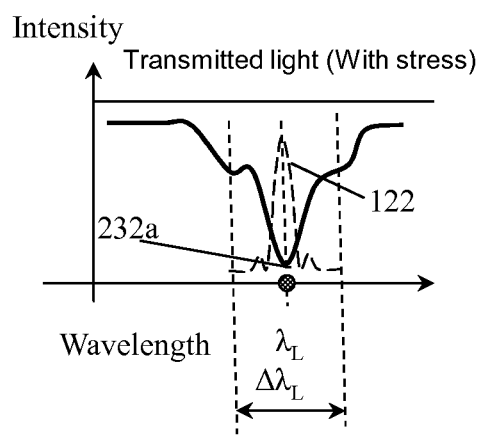

An LPFG switch can be formed by employing a phase shifted LPFG as shown in FIG. 8a. In this implementation the stress (203) is applied to the phase shift section on the LPFG through actuator (202). The transmission spectrum of the phase shifted LPFG with and without applied stress is shown in FIG. 8b and FIG. 8c. When no stress is applied to the LPFG, a narrow band signal light (122) can pass through the area (232) of the phase shifted LPFG, i.e., in the "switch on" state. When stress is applied to area (253) the LPFG has resonance loss (232a) at wavelength $\lambda_L$, i.e., in the "switch off" state. As with the previous implementation, the bandwidth of the signal light is narrower than bandwidth $\Delta\lambda_L$ of the LPFG.

Figure 9A:
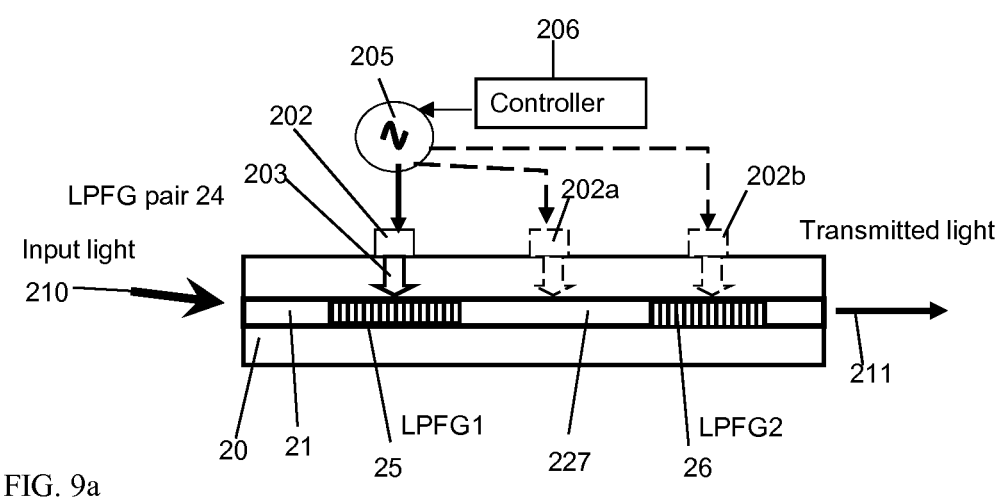
FIG. 9a illustrates an implementation of the switch based on cascaded LPFGs.
Figure 9B:
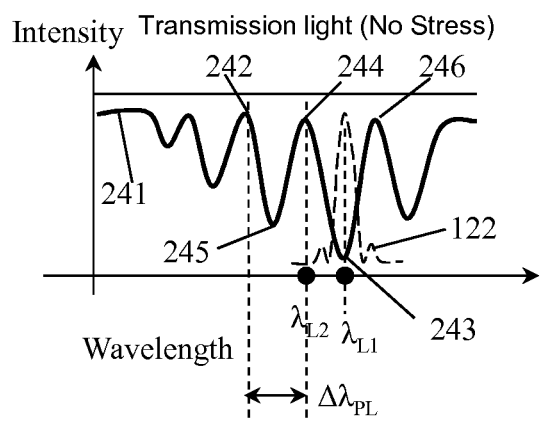
Figure 9C:
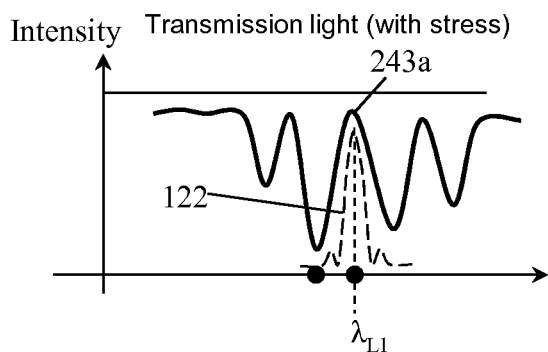

FIG. 9a illustrates an implementation of the switch based on cascaded LPFGs. A pair of LPFGs (25, 26) are disposed in series. Actuator (202 or 202b or 202a) applies stress to the section of LPFG (25) or LPFG (26) or on the fiber section (227) between LPFG (25) and LPFG (26). Initially, when no stress is applied, the transmission spectrum is as shown at section (241) in FIG. 9b. The wavelength of the signal light (122) is matched at the wavelength $\Delta\lambda_{L1}$, which is at loss peak (243) on the spectrum of the cascaded LPFGs. Consequently, the signal light (122) cannot pass through and the switch is in the "switch off" state. When the stress is applied at any of points (202, 202b or 202a), the transmission spectrum is changed as shown in FIG. 9c, where the signal light (122) can pass through since $\Delta\lambda_{L1}$ at peak (243a) is transparent.

Figure 9D:
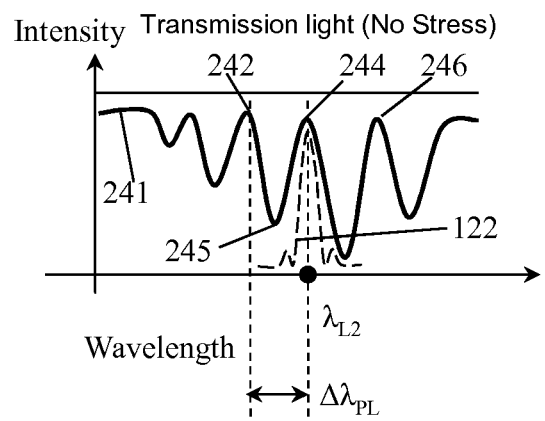
Figure 9E:
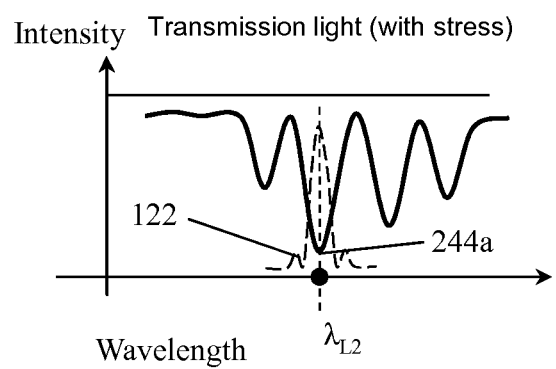

FIGS. 9d and 9e illustrate an implementation in which, when no stress is applied, the signal light (122) can pass through the cascaded LPFGs since the wavelength of the signal light is set to match $\lambda_{L2}$ at (244, FIG. 9d). When stress is applied, the signal light (122) is blocked since the spectrum of the cascaded LPFGs is changed as shown in FIG. 9e where the signal light (122) is at the loss peak (244a) in the spectrum of the cascaded LPFGs.

Figure 10:
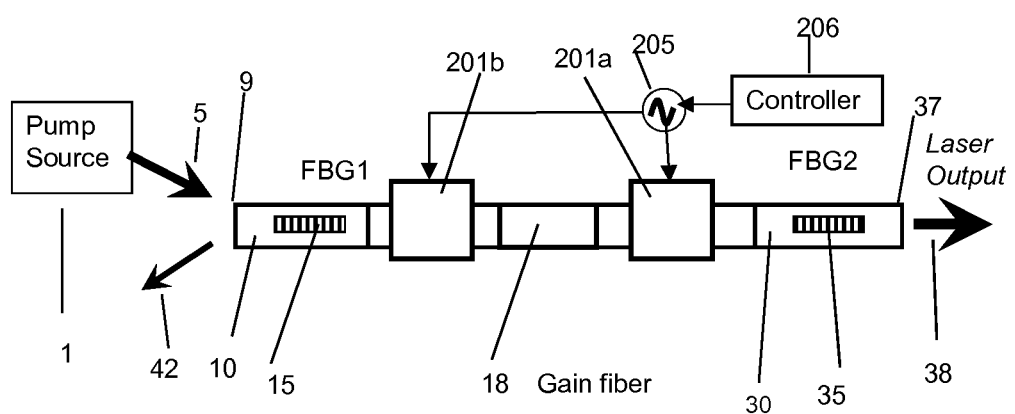
FIG. 10 illustrates a Q-switched fiber laser employing two LPFG switch in the fiber laser cavity.
Figure 11A:
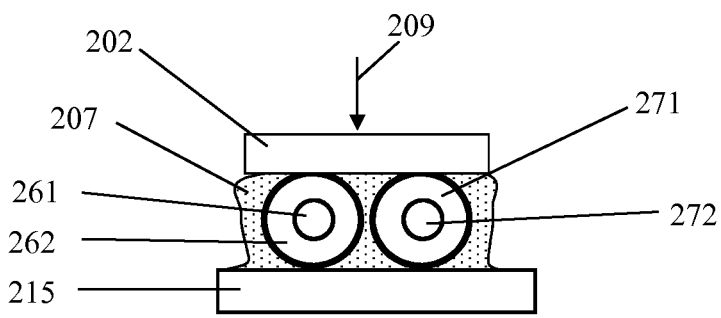
FIGS. 11a, 11b, and 11c illustrate an LPFG switch assembly using two LPFGs.
Figure 11B:
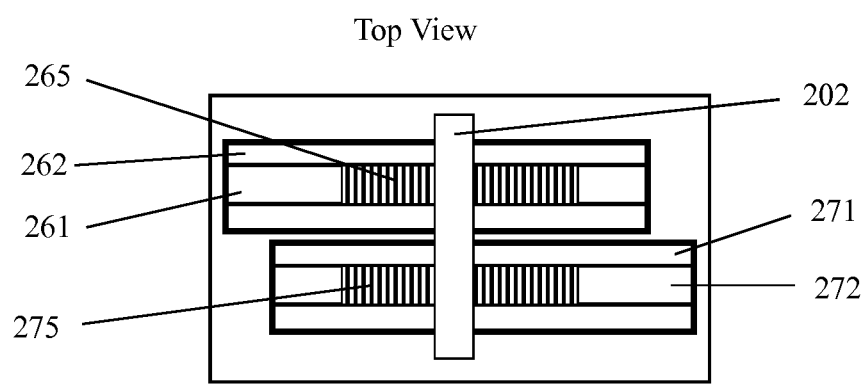
Figure 11C:
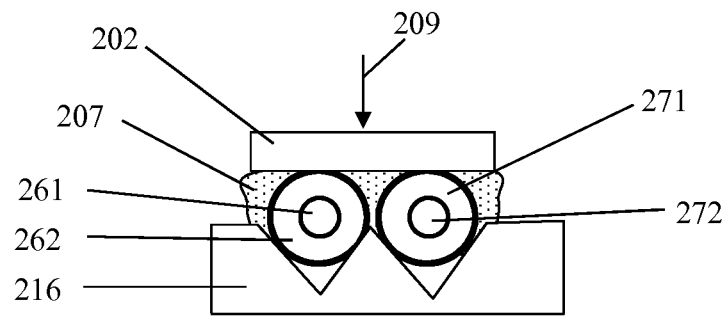
Figure 12:
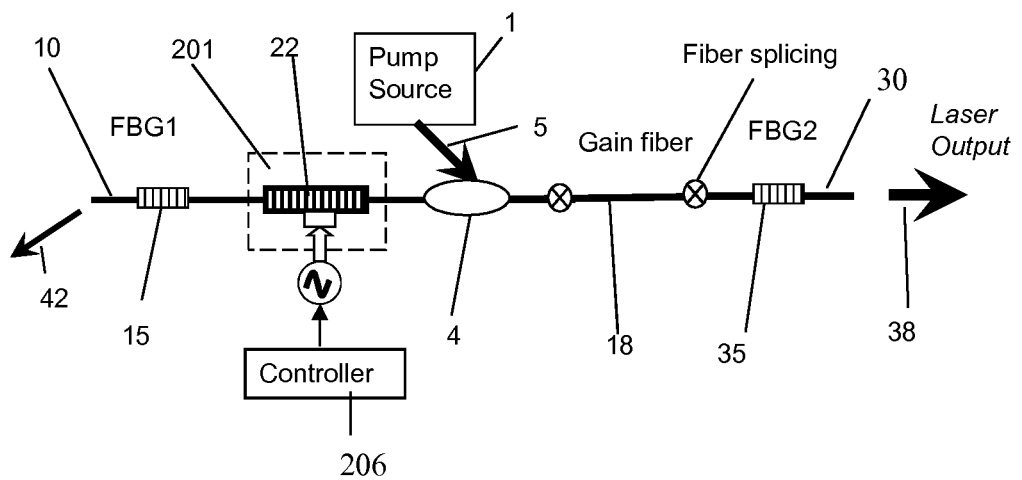
FIG. 12 illustrates a Q-switched fiber laser employing a LPFG switch in which the pump light is coupled into the laser cavity from the middle of the laser cavity.
Figure 13:
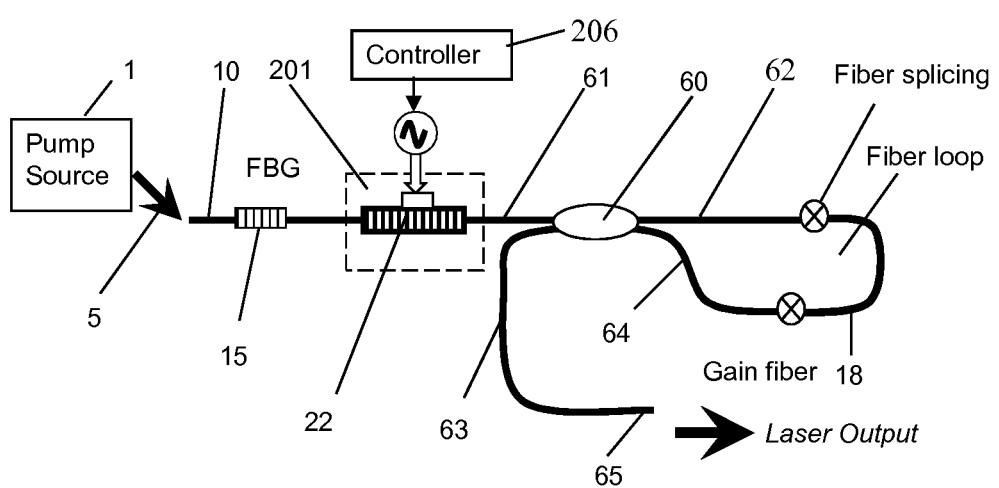
FIG. 13 illustrates a Q-switched fiber laser employing a LPFG switch in which a ring laser cavity is used and the LPFG switch is placed outside of the fiber loop.
Figure 14:
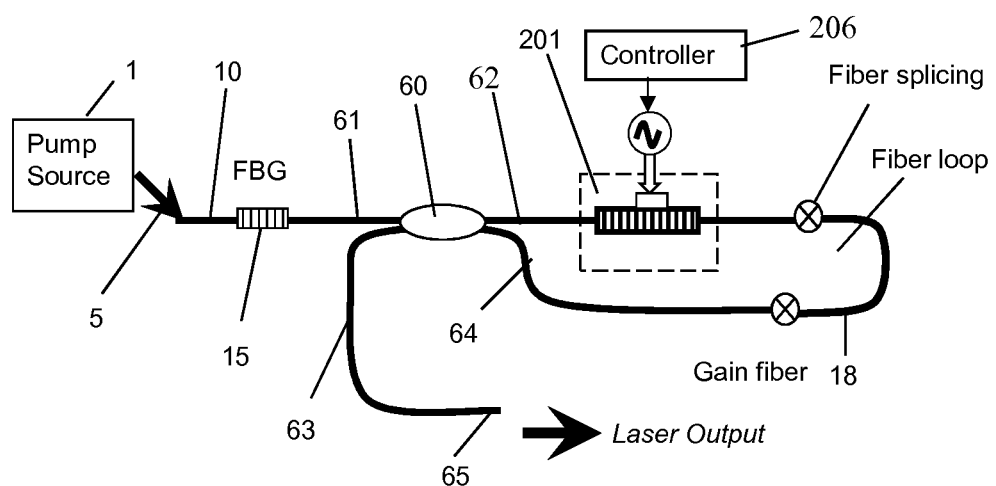
FIG. 14 illustrates a Q-switched fiber laser employing a LPFG switch in which a ring laser cavity is used and the LPFG switch is placed inside of the fiber loop.
Figure 15:
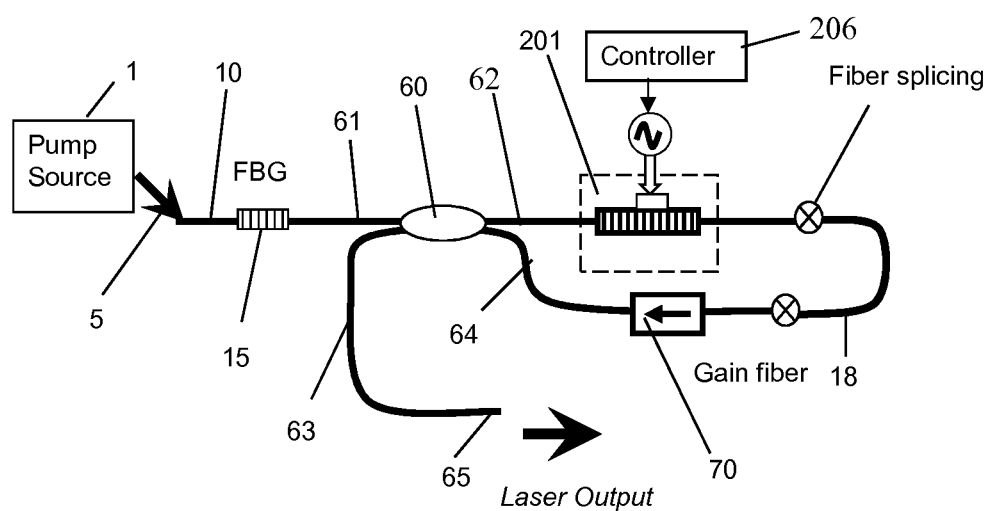
FIG. 15 illustrates a Q-switched fiber laser in which a LPFG switch is employed in a ring laser cavity and an optical isolator is employed to achieve unidirectional laser oscillation.
Figure 16:
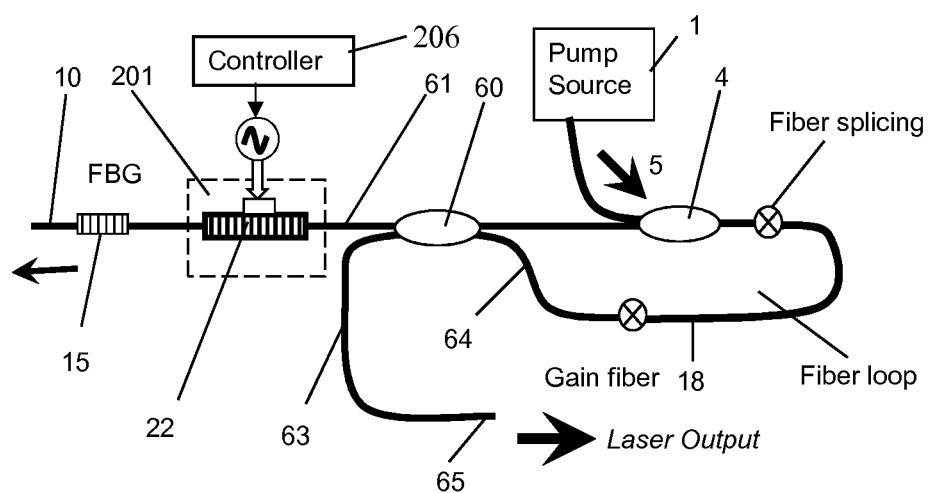
FIG. 16 illustrates a Q-switched fiber laser having a ring laser cavity in which the pump light is coupled into the laser cavity from the middle of the cavity.

Generally, any of the LPFG switches described above can be utilized to provide an all-fibre Q-switched laser. FIG. 10, for example, illustrates an implementation of the Q-switched laser in which two LPFG switches (201a, 201b) are employed in the fiber laser cavity to enhance switch extinction. Two or more LPFGs can also be packaged together as shown in FIGS. 11a, 11b and 11c. The fibers (262, 271) with LPFGs (265, 275) are sandwiched between actuator (202) and plate (215) or V-groove (216). Again, glue (207) may be used to protect and fix the fiber. Switching voltage (209) is applied to actuator (202). FIG. 12 illustrates an implementation of the Q-switched fiber laser system in which the pump light is coupled into the fiber laser cavity from the middle of the fiber laser cavity. In particular, the pump light (5) is coupled into laser cavity through pump coupler (4). The Q-switched fiber laser can also be implemented with ring laser cavity configurations as shown in FIG. 13. The laser cavity comprises FBG reflector (15), LPFG switch (201), fiber coupler (60) and gain fiber (18). Two arms (62, 64) of the fiber coupler (60) are spliced with gain fiber (18) to form a fiber loop. The LPFG switch (201) is placed outside of the fiber loop between the FBG (15) and the fiber coupler (60). The LPFG switch is transparent at the pump wavelength, and the resulting laser output comes from the arm (63) of the fiber coupler. FIG. 14 illustrates another possible implementation of the ring fiber laser cavity where the LPFG switch (201) is placed inside the fiber loop. Furthermore, the gain fiber can be placed outside of the fiber loop. In this case the fiber loop forms a fiber loop mirror. FIG. 15 illustrates another implementation of the ring fiber laser cavity in which an isolator (70) is placed in the fiber loop in order to achieve unidirectional laser oscillation in the laser cavity. The LPFG switch (201) can be placed either in the fiber loop or outside of the fiber loop between the FBG (15) and the fiber coupler (60). FIG. 16 illustrates an implementation of the LPFG switch based Q-switched fiber laser having ring laser cavity in which the pump light is coupled into the laser cavity from the middle of the cavity through the pump coupler (4). In any of the implementations of the Q-switched fiber laser employing an LPFG switch, the LPFG switch may be a simple LPFG based switch, a phase shifted LPFG based switch or a cascaded LPFGs based switch. Further, one or more LPFG switches may be used in a fiber laser cavity in order to improve switch extinction.

A number of implementations have been described. Nevertheless, it will be understood that additional modifications may be made without departing from the scope of the inventive concepts described herein, and, accordingly, other features, aspects and implementations are within the scope of the following claims.

What is claimed is:

1. A fiber laser apparatus configured to generate Q switched optical pulses, comprising:
   a first fiber Bragg grating having a first reflective center wavelength;
   a second fiber Bragg grating having a second reflective center wavelength, the second reflective center wavelength being in a reflective wavelength bandwidth of the first fiber Bragg grating, the first and second fiber Bragg gratings configured to provide optical feedback for laser oscillation and to confine laser oscillation wavelength;
   at least one long period fiber grating disposed between the first fiber Bragg grating and the second fiber Bragg grating, the long period fiber grating having a switching wavelength in which a switching wavelength bandwidth fully covers the wavelength bandwidth of the first fiber Bragg grating and the second fiber Bragg grating;
   a gain fiber disposed between the first fiber Bragg grating and the second fiber Bragg grating, the gain fiber configured to provide optical gain; and
   at least one actuator configured to apply stress to the long period fiber grating to cause switching of Q factor of the laser cavity and generation of Q switched optical pulses.

2. The fiber laser of claim 1 wherein the actuator causes temporary deformation of the long period fiber grating, resulting in a change of effective refractive index.

3. The fiber laser of claim 2 further comprising a controller which controls the actuator such that the stress is applied in a periodic time varying manner.

4. The fiber laser of claim 3 wherein the actuator applies the stress acoustically.

5. The fiber laser apparatus of claim 1 further comprising an optical fiber selected from a group including: normal fiber, double clad fiber, photonic crystal fiber, polarization maintaining fiber and rare earth doped fiber.

6. The fiber laser apparatus of claim 1 wherein the at least one long period fiber grating is selected from a group including: a normal long period fiber grating, a phase shifted long period fiber grating and a cascaded long period fiber grating.

7. A fiber laser apparatus configured to generate Q switched optical pulses, comprising:
   a fiber Bragg grating reflector configured to provide optical feedback for laser oscillation and to confine laser oscillation wavelength;
   a fiber loop mirror formed by splicing first and second distal ends of a fiber coupler;
   at least one long period fiber grating disposed between the fiber Bragg grating reflector and the fiber loop mirror, the long period fiber grating having a switching wavelength in which a switching wavelength bandwidth fully covers a wavelength bandwidth of the fiber Bragg grating;
   a gain fiber configured to provide optical gain; and at least one actuator configured to apply stress to the long period fiber grating to cause switching of Q factor of the laser cavity and generation of Q switched optical pulses.

8. The fiber laser of claim 7 wherein the actuator causes temporary deformation of the long period fiber grating, resulting in a change of effective refractive index.

9. The fiber laser of claim 8 further comprising a controller which controls the actuator such that the stress is applied in a periodic time varying manner.

10. The fiber laser of claim 9 wherein the actuator applies the stress acoustically.

11. The fiber laser apparatus of claim 7 further comprising an optical fiber selected from a group including: normal fiber, double clad fiber, photonic crystal fiber, polarization maintaining fiber and rare earth doped fiber.

12. The fiber laser apparatus of claim 7 wherein the at least one long period fiber grating is selected from a group including: a normal long period fiber grating, a phase shifted long period fiber grating and a cascaded long period fiber grating.

13. A fiber laser apparatus configured to generate Q switched optical pulses, comprising:
    a fiber Bragg grating reflector configured to provide optical feedback for laser oscillation and to confine laser oscillation wavelength;
    a fiber loop mirror formed by splicing first and second distal ends of a fiber coupler;
    at least one long period fiber grating disposed in the fiber loop mirror, the long period fiber grating having a switching wavelength in which a switching wavelength bandwidth fully covers a wavelength bandwidth of the fiber Bragg grating reflector;
    a gain fiber configured to provide optical gain; and
    at least one actuator configured to apply stress to the long period fiber grating to cause switching of Q factor of the laser cavity and generation of Q switched optical pulses.

14. The fiber laser of claim 13 wherein the actuator causes temporary deformation of the long period fiber grating, resulting in a change of effective refractive index.

15. The fiber laser of claim 13 further comprising a controller which controls the actuator such that the stress is applied in a periodic time varying manner.

16. The fiber laser of claim 14 wherein the actuator applies the stress acoustically.

17. The fiber laser apparatus of claim 13 further comprising an optical fiber selected from a group including: normal fiber, double clad fiber, photonic crystal fiber, polarization maintaining fiber and rare earth doped fiber.

18. The fiber laser apparatus of claim 13 wherein the at least one long period fiber grating is selected from a group including: a normal long period fiber grating, a phase shifted long period fiber grating and a cascaded long period fiber grating.

* * * * *